United States Patent [19]
Nishina et al.

[11] Patent Number: 5,363,566
[45] Date of Patent: Nov. 15, 1994

[54] CLAMPING ASSEMBLY FOR MEASURING INSTRUMENT

[75] Inventors: Shingo Nishina, Kawasaki; Tamio Suzuki; Kazuhiko Kimura, both of Tochigi, all of Japan

[73] Assignee: Mitutoyo Corporation, Tokyo, Japan

[21] Appl. No.: 993,117

[22] Filed: Dec. 18, 1992

[30] Foreign Application Priority Data

Dec. 24, 1991 [JP] Japan ............... 3-106247[U]

[51] Int. Cl.$^5$ ................. F16B 7/04; G01B 21/16
[52] U.S. Cl. ........................ 33/810; 33/783; 403/341
[58] Field of Search ............... 33/810, 783, 784, 787, 33/791, 792, 794, 795, 806, 832; 403/351, 341

[56]  References Cited

U.S. PATENT DOCUMENTS

| | | | |
|---|---|---|---|
| 2,467,263 | 4/1949 | Krisanda | 33/810 |
| 2,529,931 | 11/1950 | Gallup, Sr. | 33/810 |
| 3,304,099 | 2/1967 | Jankowski | 403/341 |
| 4,553,337 | 11/1985 | Brewster | 33/784 |
| 4,821,421 | 4/1989 | Girardier et al. | 33/784 |

FOREIGN PATENT DOCUMENTS

| | | | |
|---|---|---|---|
| 0082270 | 2/1920 | Switzerland | 33/810 |
| 84465 | 8/1920 | Switzerland | 33/810 |

*Primary Examiner*—Christopher W. Fulton
*Attorney, Agent, or Firm*—Flynn, Thiel, Boutell & Tanis

[57]  ABSTRACT

A clamping assembly for attaching a probe device to an attachment arm of a measuring instrument which extends from the instrument along a first axis. The probe device has a base arm positioned adjacent to the attachment arm in an axially overlapping manner. The clamping assembly includes a first annular clamping member proximate the measuring instrument, a second annular clamping member positioned axially adjacent the first clamping member, a rotatable annular clamping ring encompassing the first and second clamping members, and an arrangement for offsetting a central bore of the second clamping member relative to a central bore of the first clamping member along an axis extending perpendicular to the first axis during a relative axial movement between the clamping ring and the first clamping member. The effect is to urge the base arm into abutment with the attachment arm in a direction along the second axis.

15 Claims, 8 Drawing Sheets

PRIOR ART

CLAMPING ASSEMBLY FOR MEASURING INSTRUMENT

BACKGROUND OF THE INVENTION

1. Field of the Invention

This invention relates to a clamping assembly for a measuring instrument, especially, a clamping assembly to install a probe such as scriber, touch signal probe or jaw to a measuring instrument such as height gage or caliper.

2. Description of the Related Art

Figure 8:
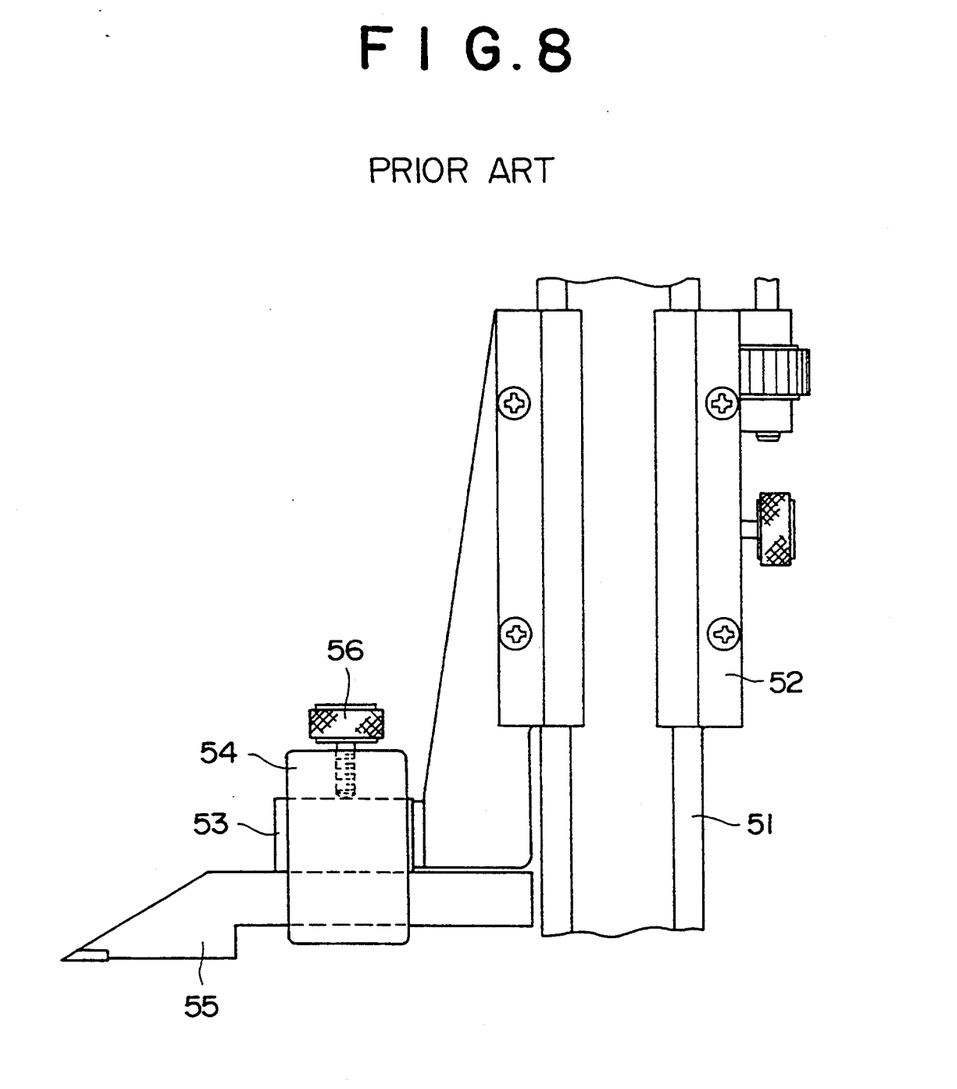
FIG. 8 is a side view showing a conventional example of the prior art.

When a probe such as a scriber 55 used in a scribing or measuring procedure is installed to a measuring instrument such as the height gage as shown in FIG. 8, a jaw 53 has previously been secured to a slide 52 which was vertically slidably movable along main scale 51 of the height gage so that the jaw 53 and scriber 55 were interlocked to each other by a box-type scriber clamp 54 and a a fixing screw 56.

However, in such a conventional clamping assembly, the use of the fixing screw 56 with a larger diameter is restricted due to the limitation of the appearance and production. The fastening force which occurs at a tip of the fixing screw 56 by verging the jaw 53 is rather small, so that fixation of the scriber 55 tends to be insufficient.

Because the fixing screw 56 is fastened with a fingertip, it is not easy to operate and difficult to force power. In the worst case, severe damage to the thread of fixing screw 56 was observed. Moreover, the fixing screw 56 can easily be lost since it is removed every time the scriber 55 is installed or removed, thus there is a problem with maintenance. The external appearance of the fixing screw 56 on the scriber clamp 54 was not preferable in view of the design. As has been mentioned, the presence of several problems in the conventional clamping assembly which uses the fixing screw 56 therein are admitted.

Incidentally, in a caliper which uses a jaw as the probe, a similar interlocking situation to the above-explained height gage was employed, too. In a known assembly, the jaw is mounted on the caliper body by means of a clamp and the fixing screw, which is the same as in the height gauge. Another assembly has already been proposed in Japanese Patent Application Laid-open No. 63-165702, wherein the jaw was directly secured to the caliper body with the fixing screw. However, the same problems as in the height gage, such as an unstable clamp and a missing of the fixing screw have taken place. The purpose of this invention is to provide a preferable clamping assembly which can secure a probe such as the scriber with greater fastening force and is easy to operate and control with an excellent appearance.

SUMMARY OF THE INVENTION

A clamping assembly for an measuring instrument to secure a probe to a part to be secured at the measuring instrument, in this invention, having: a clamp holder having a column shape periphery on which a male screw is formed and, at the center portion thereof, an insertion hole into which both the part to be secured at the measuring instrument and a fixing part of the probe are inserted; a piece clamp having, at the center portion thereof, an insertion hole into which both the part to be secured at the measuring instrument and a fixing part of the probe are inserted; a nut clamp having a female screw corresponding to the male screw of said clamp holder on an internal surface thereof, and a connection part to move said piece clamp in accordance with an axial displacement degree when the female screw of said nut clamp is screwed into the male screw of said clamp holder; and a guide means for moving said piece clamp to a right-angled direction to a center axis of said clamp holder in accordance with a movement of said piece clamp by means of said nut clamp.

In this invention, a part to be fixed at the measuring instrument and a fixing part of the probe are inserted into an insertion hole which was formed in each of the clamp holder and piece clamp which can be accommodated in a nut clamp, and then the piece clamp is moved axially with the connection part by turning the nut clamp. At the same time, the piece clamp also moves to the direction diagonal to central axis of the clamp holder by means of the guide means, in response to axial direction moving of the nut clamp. Therefore, an interval between two surface which faces each other in insertion hole which is formed by the piece clamp and the clamp holder becomes small and the part to be fixed at the measuring instrument and the fixing part of the probe are fastened and fixed.

At that time, the part to be fixed at the measuring instrument and the probe fixing part can be fixed by touching with inner side of each insertion hole of the piece clamp and the clamp holder. Therefore, bigger fastening area is secured compared with the conventional fixing screw. As a result, fastening power become bigger and the probe is certainly fixed to the measuring instrument. Also, a probe can be installed by rotating the comparatively big nut clamp which can accommodate the piece clamp and the clamp holder inside, so that it is easy to operate and there are no problem with loss and a damage and appearance improves, compared with a fixing screw.

DETAILED DESCRIPTION OF THE PREFERRED EMBODIMENT(S)

The preferred embodiment of the present invention will now be described with reference to the drawings.

Figure 1:
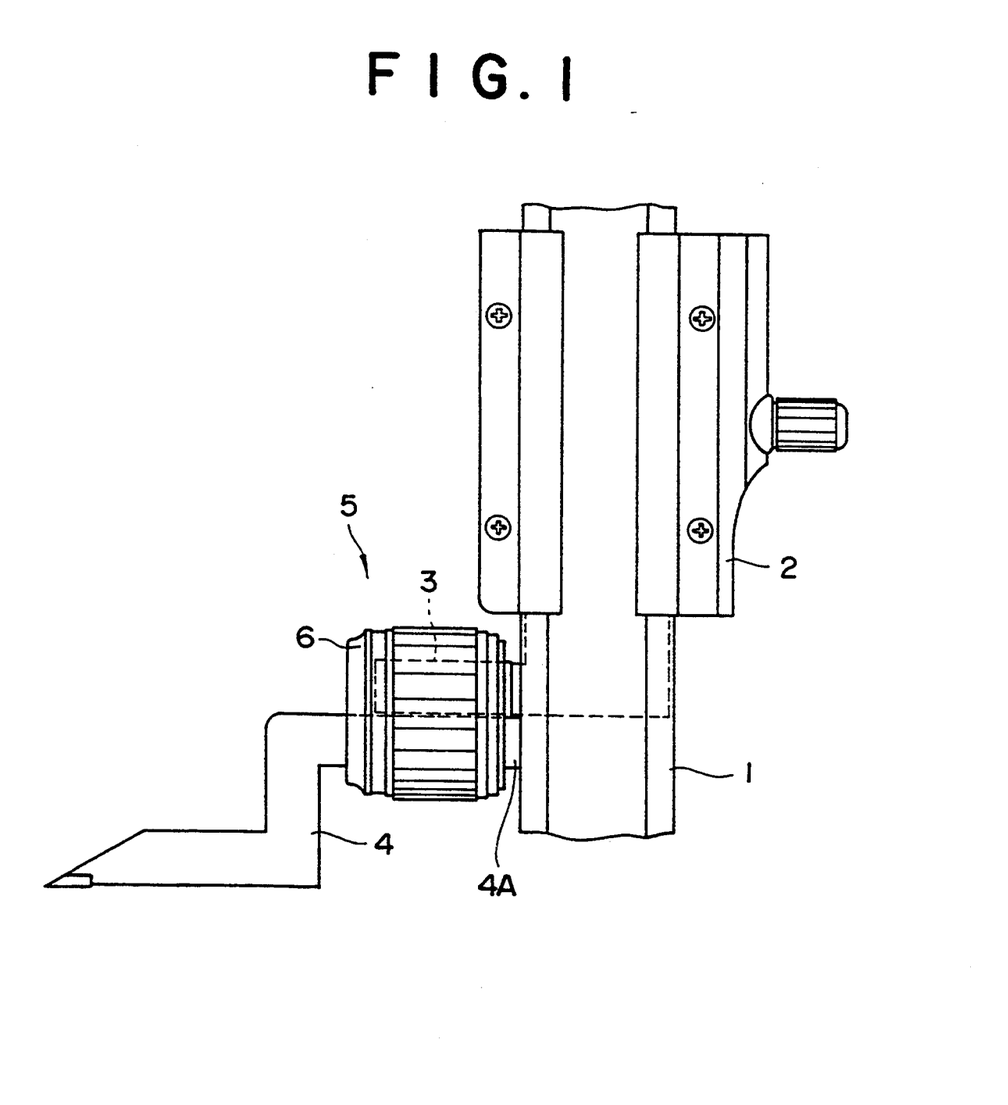
FIG. 1 is a side view showing the 1st embodiment of this invention.

FIG. 1 shows a clamping assembly 5 in the 1st embodiment according to this invention, which is provided to secure a fixing part or base arm 4A of scriber 4 as a probe to a jaw or attachment arm 3, as a part to be fixed, which is projected outwardly laterally from a slide 2, the slide 2 being vertically movable relative to a main blade 1 of a height gage.

Figure 2:
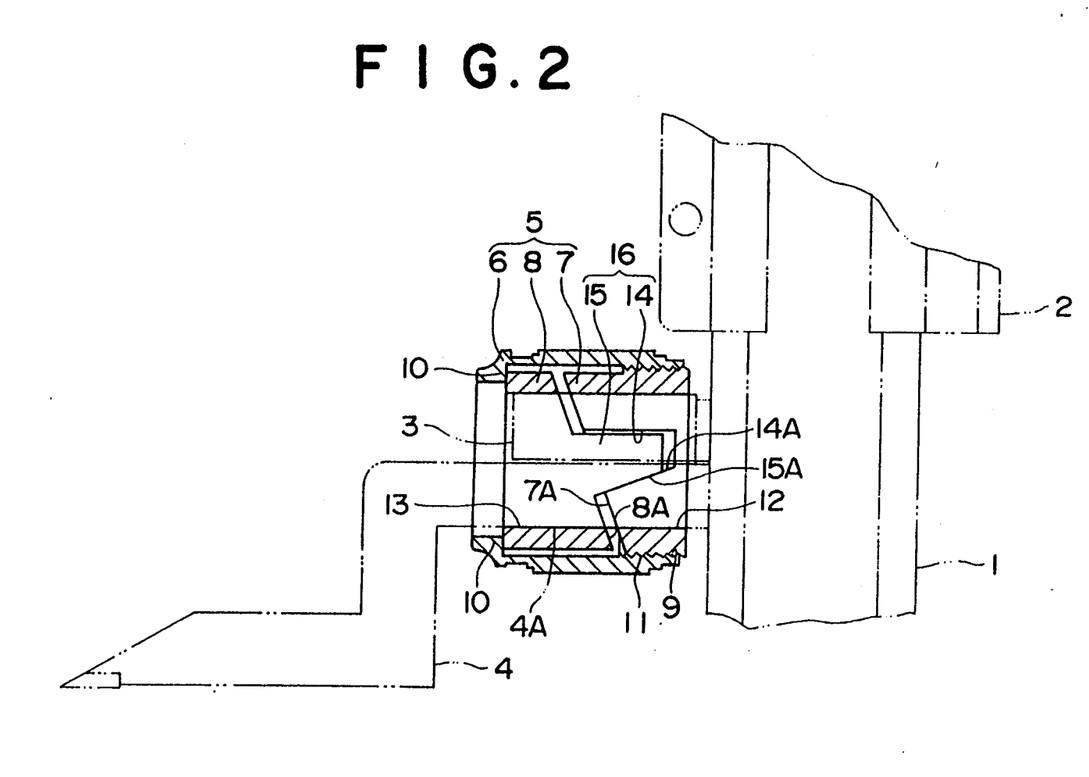
FIG. 2 is a longitudinal sectional view showing a state of clamping assembly before clamping in this embodiment.
Figure 3:
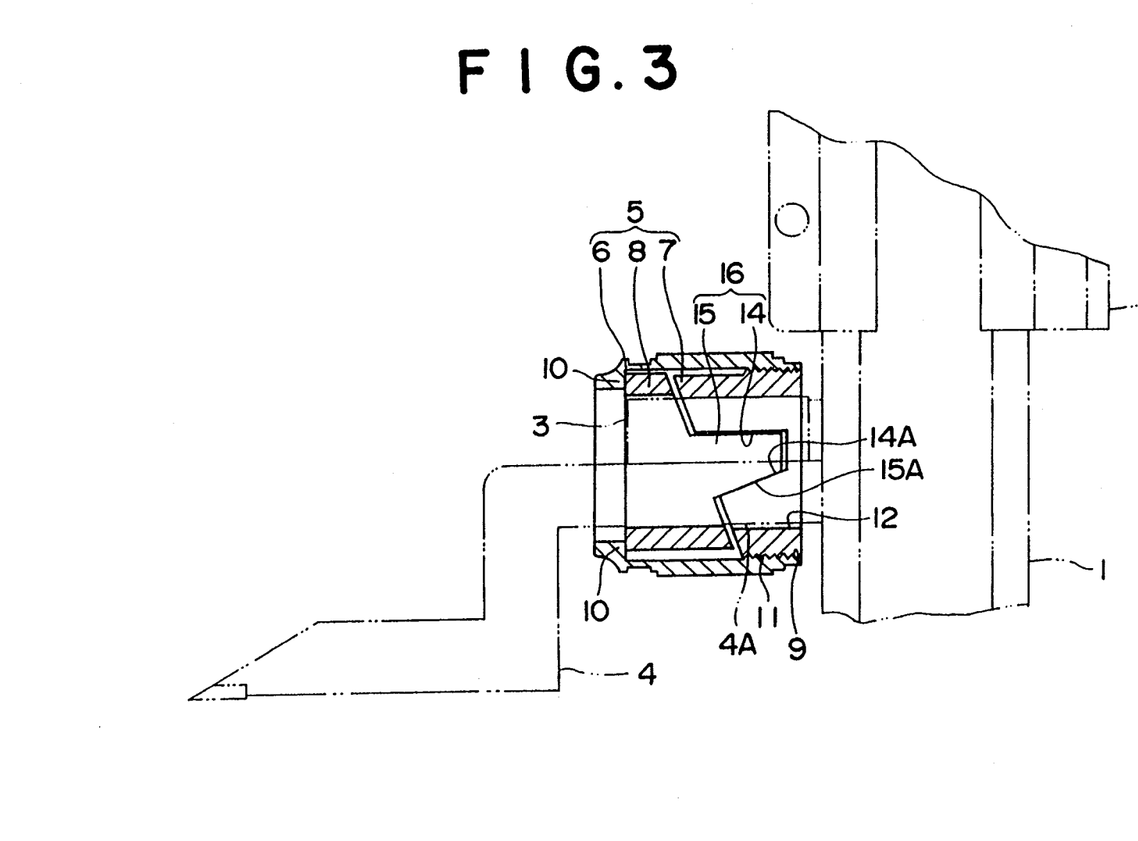
FIG. 3 is a longitudinal sectional view showing an active state of the clamping assembly in this embodiment.

The clamping assembly 5 is, as shown in FIGS. 2 and 3, defined by a cylindrical nut and a piece clamp or clamping member 8, the members 7 and 8 are arranged within the nut clamp 6.

The nut clamp 6 is formed with a female screw 9 on an inner surface at one opening side thereof and a connection part or annular flange 10 at the other opening thereof. The female screw 9 of the nut clamp 6 can meet with a corresponding male screw 11 of the clamp holder 7 to move longitudinally to and away from the clamp holder 7 in response to the self rotation.

Figure 4:
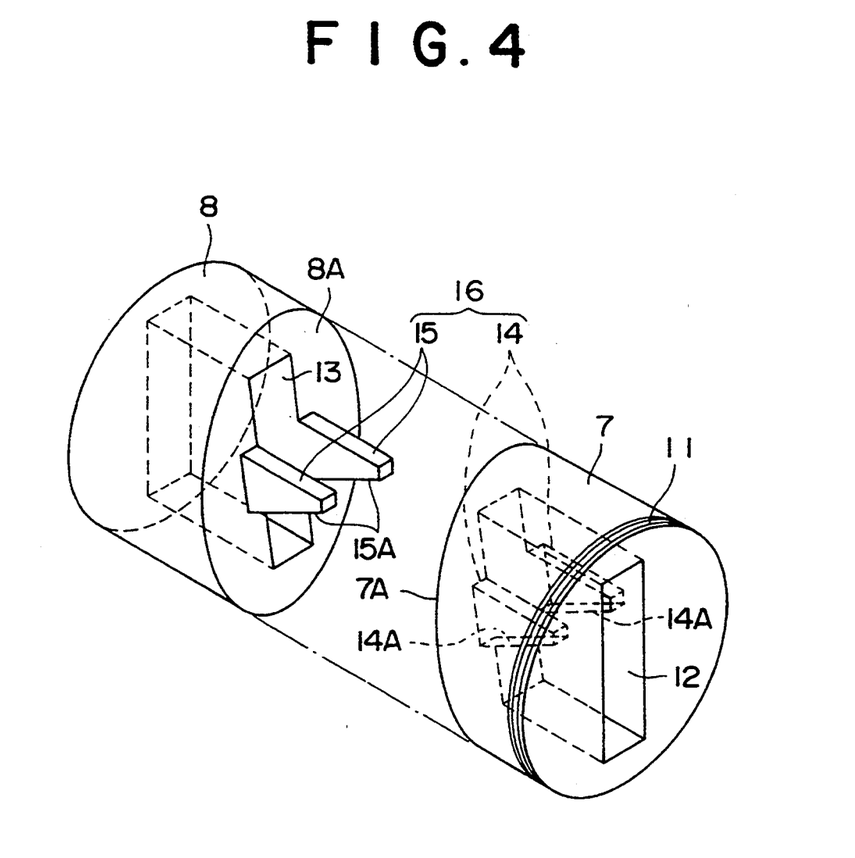
FIG. 4 is a perspective view showing a clamp holder and a piece clamp of the clamping assembly in this embodiment.

The clamp holder 7 and piece clamp 8 are formed into cylindrical shape with tapered surfaces 7A and 8A, respectively, so as to face each other, as shown in FIG. 4, and are also provided with square-pipe like insertion holes or bores 12 and 13 aligned with a coaxial center thereof. The insertion or bores holes 12 and 13 have the almost same width dimension as the jaw 3 and the fixing part 4A of the scriber 4. The height dimension of the insertion holes 12, 13 is slightly bigger than the dimension given by adding the jaw 3 and the fixing part 4A of scriber 4.

In the clamp holder 7, a pair of guide grooves or recesses 14 which are opened toward the tapered surface 7A are provided in both lateral walls of the insertion hole 12. An underside 14A of each guide groove 14 descends steeply toward the tapered surface 7A or inclines toward the axial direction of clamp holder 7.

While, the piece clamp 8 has a pair of corresponding guide protrusions or arms 15 from the tapered surface 8A at both lateral side of the insertion hole 13, which can be inserted into the guide grooves 14 of clamp holder 7. An underside 15A of each guide protrusion 15 tapers so as to fit with the inclination degree of the underside 14A of guide groove 14. Therefore, if the guide protrusion 15 is driven to be inserted into and taken out from the guide groove 14, moving the piece clamp 8 forward or backward to the clamp holder 7, the piece clamp 8 goes up and down relative to the clamp holder 7 according to the inclination of the undersides 14A and 15A. Incidentally, a guide means 16 is defined by the guide groove 14 and the guide protrusion 15.

A procedure to secure the scriber 4 will hereunder be explained. Putting the piece clamp 8 into the nut clamp 6, the clamping assembly 5 can be formed by screwing the clamp holder 7 into the nut clamp 6. And then the jaw 3 and the fixing part 4A of scriber 4 are inserted into the insertion holes 12, 13 made in the clamp holder 7 and the piece clamp 8 of the clamping assembly 5, as shown in FIG. 2.

When the nut clamp 6 is turned with one hand to approach the clamp holder 7, the piece clamp 8 is also moved to the clamp holder 7 by means of the connection part 10. At that time, the guide protrusion 15 is inserted into the corresponding guide groove 14 so that the piece clamp 8 moves up to the clamp holder 7. Then, a gap or offset between the upper surface of the insertion hole 12 of clamp holder 7 and the lower surface of the insertion hole 13 of piece clamp 8 narrows, so that the jaw 3 and the fixing part 4A of the scriber 4 are firmly interlocked each other, as shown in FIG. 3.

To remove the thus-interlocked scriber 4 from the clamping assembly 5, turn the nut clamp 6 to the opposite direction to the previous procedure so as to move to the piece clamp 8 from the clamp holder 7. Simultaneously, the connection part 10 of nut clamp 6 leaves the piece clamp 8 and then a gap between the upper surface of the insertion hole 12 of clamp holder 7 and the lower surface of the insertion hole 13 of piece clamp 8 expands. Accordingly, the interlocking relation between the jaw 3 and the scriber 4 loosens and the removal of scriber 4 becomes possible.

In this embodiment, compared with a case when using a fixing screw like the conventional assembly, the jaw 3 and the scriber 4 are fastened together in the insertion holes 12 and 13, using bigger area. The fastening power for the scriber 4, in this embodiment, is enough to use in measuring and working.

The conventional fixing screw should be operated only with fingertip, but the nut clamp 6 which incorporates the clamp holder 7 and the piece clamp 8 thereinside can be operated by one hand. Therefore, it becomes easy to operate and the scriber 4 is certainly fixed by big power.

Since the clamp holder 7 and the piece clamp 8 are arranged in space inside of the nut clamp 6 and the prominence like a conventional fixing screw is omitted, an appearance, quality and hand touch can be improved.

Moreover, the scriber 4 can be removed or attached without removing the nut clamp 6 from the clamp holder 7, there will be no inconvenience such as loss or damage of the fixing screw which was removed when using the a conventional fixing screw and then a maintenance becomes easy.

Simplification of replacement work from the presently using scriber 4 to a touch probe, center probe, depth attachment, test indicator or the like can improve conformability to various measurements and works. Moreover, it is not necessary to prepare individual height gages according to various measurements and works. It is adequate to preparing only probes individually. Therefore, a measuring instrument effecting various measurements can be prepared inexpensively.

Figure 5:
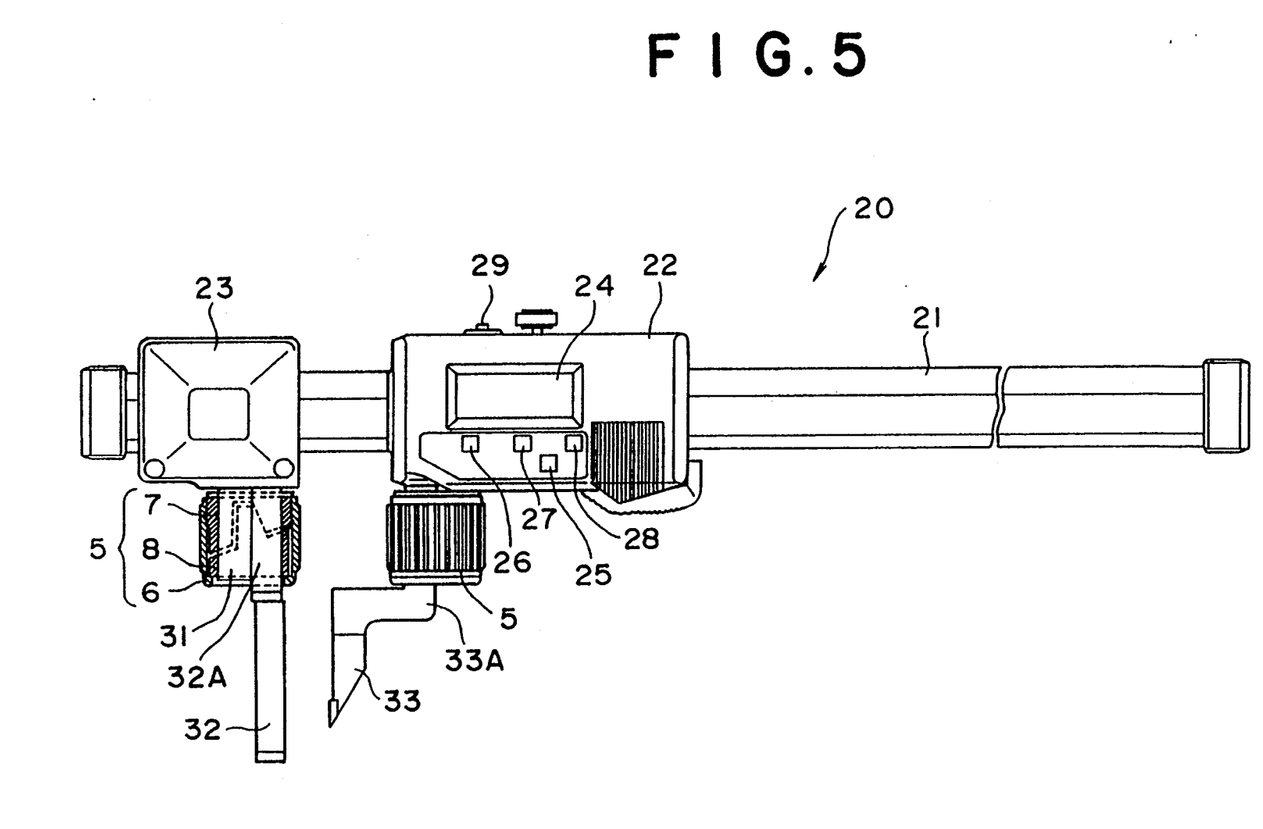
FIG. 5 is a side view showing the 2nd embodiment in this invention.

The 2nd embodiment which follows this invention is shown in FIG. 5. This embodiment shows a case when the above-explained clamping assembly 5 of this invention is applied to a caliper 20. The caliper 20 is defined by a main blade 21, the first slider or sliding member 22 and the second slider or sliding member 23.

The first slider 22 includes a capacitance-type encoder therein to measure a relative movement distance to the main blade 21. The value measured by the encoder is displayed digitally on a display part 24. Incidentally, the surface panel of the first slider 22 is provided with a on/off switch 25 for the power source, a preset switch 26, an offset switch 27, a zero set switch 28, a data hold switch 29 appropriately for ease of operation.

Figure 6:
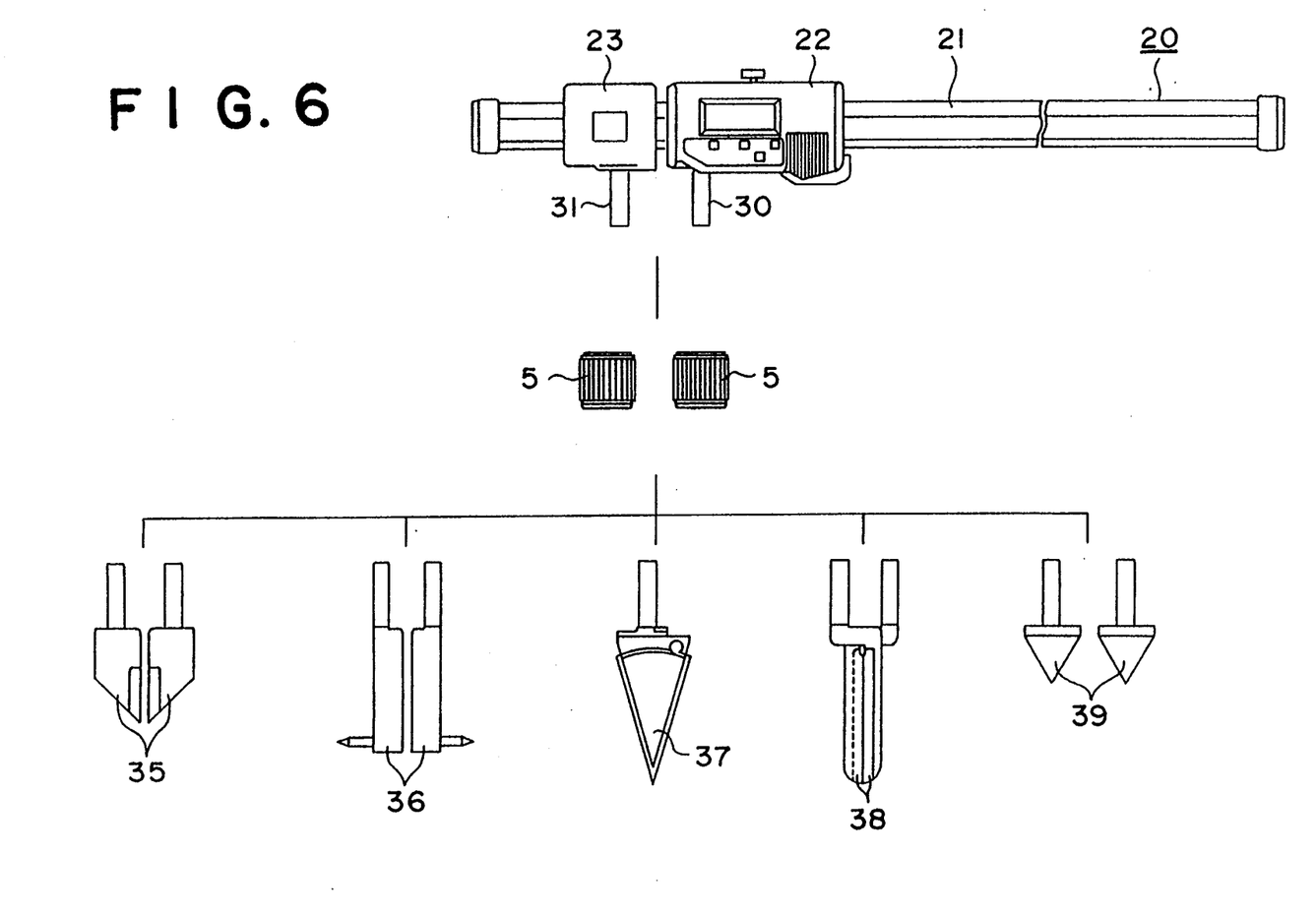
FIG. 6 is an explanatory view exemplary showing detachable probes for measurement in the 2nd embodiment.
Figure 7:
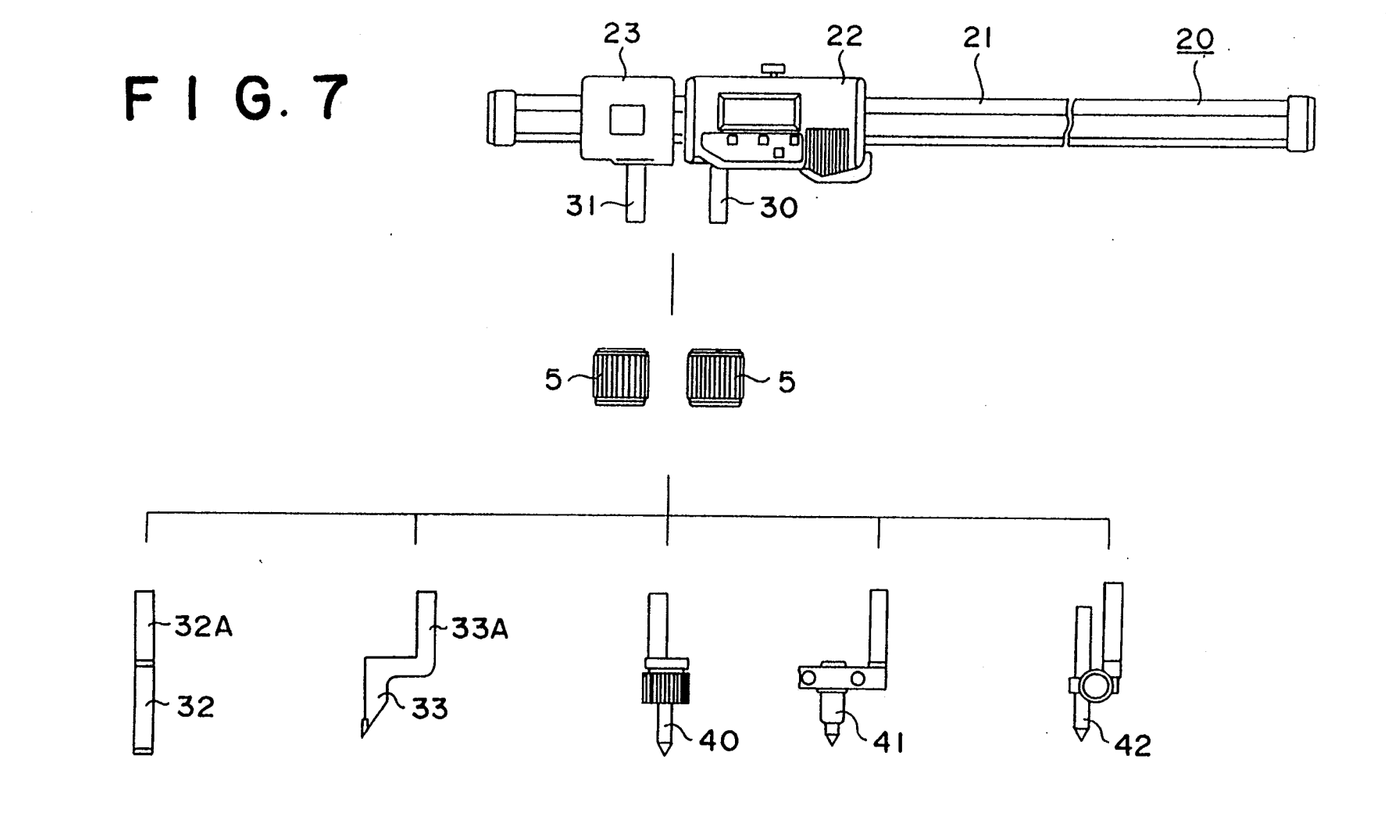
FIG. 7 is an explanatory view exemplary showing detachable probes for working in the 2nd embodiment.

The first slider 22 is formed with a jaw fixing part 30, as a part to be fixed, as shown in FIGS. 6, 7.

While, the 2nd slider 23 can set or move relative to the main blade 21 so that the standard position for measurement can be set at an optional position on the main blade 21. This second slider 23 is formed with a jaw fixing part 31, as a part to be fixed, like the above-mentioned 1st slider 22.

To the jaw fixing part 31, a standard plate 32 is fixed by means of the clamping assembly 5 which can be defined by the nut clamp 6, the clamp holder 7 and the piece clamp 8 as the first embodiment mentioned before.

While, to the jaw fixing part 30, a scriber 33 is fixed by means of the same clamping assembly 5.

In this second embodiment, the standard plate 32 and scriber 33 can be fixed by inserting each of the jaw fixing parts 30, 31 and fixing parts 32A, 33A of standard plate 32 and scriber 33 into the insertion holes 12, 13 of the clamp holder 7 and the piece clamp 8 which define the clamping assembly 5, like the first embodiment mentioned before.

Next, the nut clamp 6 is turned by hand and moved to the holder 7, and the piece clamp 8 is also moved to the clamp holder 7 simultaneously. At that time, with the function of the guide groove 14 and the guide protrusion 15, the piece clamp 8 moves to the right-angled direction to the center axis of the clamp holder 7. With the insertion hole 13 of clamp holder 7 and the insertion hole 12 of piece clamp 8, each of the jaw fixing parts 30, 31, and the fixing parts 32A and 33A of standard plate 32 and scriber 33 are clamped.

Naturally, the standard plate 32 or the scriber 33 can be removed by turning the nut clamp 6 while moving to the piece clamp 8 from the clamp holder 7. Fixation between each of the jaw fixing parts 30, 31 and the fixing part 32A, 33A of the standard plate 32 or the scriber 33 is canceled and then the standard plate 32 or the scriber 33 is removed.

Incidentally, in the above-mentioned 2nd embodiment, one which can be secured to the jaw fixing parts 30, 31 is not only the mentioned standard plate 32 and the scriber 33, it also can be measurement jaws such as a M-type jaw 35, point jaw 36, center probe 37, jaw 38 for groove, or hole pitch jaw 39, as shown in FIG. 6. Moreover, as show in FIG. 7, instead of the scriber 33, various pointers for scribing such as working-level jaws designated by 40, 41 and 42 working-level jaw can be used. For example, in case of an arc scribing, one of the suitable pointers 40–42 for the scribing can be installed instead of the standard plate 32.

In this second such embodiment, it is of course possible to obtain the same effect and achieve the same purpose like the first embodiment mentioned above.

Moreover, since it is possible to use the same clamping assembly 5 as in the first embodiment mentioned above, it is possible to use the accessories such as jaw for measurements (for business) clamping assembly 5 in common for various measuring instruments such as height gage or calipers. Therefore, since it is not necessary to develop or produce accessories according to measuring instrument, equipment is supplied to the market at reasonable price. Moreover, if these accessories are supplied in a set, even if the kind of the measuring instrument is different like height gage and calipers, one kind of accessory is enough. As a result, mass production of accessory becomes possible and low price will be accelerated further.

Incidentally, the embodiment of this invention are not limited to above-mentioned examples, but also includes modification, the improvement in the range where it is possible to achieve a purpose of this invention.

For example, the clamping assembly 5 of this invention is not limited to the height gage and calipers 20 as in the above embodiments. It can be applied to the various measuring instrument which is equipped with the part to be fixed which is inserted into the insertion holes 12, 13 of the clamp holder 7 and piece clamp 8 with the probe.

Also, the use of guide means 16 is not limited in the above mentioned embodiment, but, for example, it is possible to provide the guide protrusion 15 for the side of clamp holder 7 and the guide groove 14 for the side of piece clamp 8. Moreover, instead of providing the guide protrusion 15 and guide groove 14, the guide clamp holder 7 and piece clamp 8, at the tapered surfaces 7A, 8A where the clamp holder 7 and piece clamp 8 face each other, relatively shift to the right-angled direction.

Moreover, in the above mentioned embodiments, when the connection part 10 abuts to the piece clamp 8 and then the nut clamp 6 moves to the clamp holder 7, the piece clamp 8 is moved to the clamp holder 7 and to the right-angled direction. However, when the connection part 10 does not allow the piece clamp 8 to move axially and the piece clamp 8 moves to direction leaving from the clamp holder 7, or when the piece clamp 8 goes forward or backward relative to the clamp holder 7 without limiting moving directions, the guide mean 16 and the connection part 10 can be defined so as to move the piece clamp 8 to the right-angled direction.

In short, it is good enough if the guide mean 16 can move the piece clamp 8 to the right-angled direction to the clamp holder 7 when the piece clamp 8 is axially moved with the movement of the nut clamp 6.

Moreover, it is good enough to produce the nut clamp 6, clamp holder 7, piece clamp 8 from the suitable materials such as metal and resin, however, it is possible to reduce a manufacture cost and provide them cheaply by using resin forming articles such as plastic. That is, in this invention, it is possible to improve installation strength compared with the case when used a fixing screw.

Even if a plastic and so on is used, the hardness problem does not take place.

With such a clamping assembly of the measuring instrument in this invention, it is possible to secure the probe such as scriber certainly with big fastening power and improve ease of operation and ease maintenance and improve appearance.

What is claimed is:

1. A clamping assembly for attaching a probe device to an attachment arm of a measuring instrument which extends from the instrument along a first axis, the probe device having a base arm adjacent to the attachment arm in an axially overlapping manner, the assembly comprising:

a first annular clamping member proximate the measuring instrument, the first clamping member having a first axially extending central bore therethrough and an externally threaded portion on a radially outer surface thereof;

a second annular clamping member positioned axially adjacent the first clamping member remote from the measuring instrument and having a second axially extending central bore therethrough, the second clamping member being axially movable relative to the first clamping member, and the attachment and base arms extending through the first and second central bores;

an annular clamping ring encompassing the first and second clamping members, the clamping ring having an annular flange extending radially inwardly from an end surface of the clamping ring proximate the probe device and an internally threaded portion which threadably engages the externally threaded portion of the first clamping member to effect a relative axial movement between the clamping ring and the first clamping member, the annular flange urging the second clamping member in a direction along the first axis during the relative axial movement; and means for effecting an offset of the second central bore relative to the first central bore along a second axis extending perpendicular to the first axis during the relative axial movement to urge the base arm into abutment with the attachment arm in a direction along the second axis.

2. The clamping assembly claimed in claim 1, wherein the means for effecting an offset includes guide means for urging the second clamping member along a third axis extending transverse to the first axis to effect the offset of the second central bore along the second axis.

3. The clamping assembly claimed in claim 2, wherein the guide means includes a plurality of recesses formed in a first end surface of the first clamping member which extend axially through the first clamping member, and a plurality of guide arms extending axially from a second end surface of the second clamping member which project toward the first clamping member, the second end surface being in mutually opposing relation to the first end surface, the guide arms substantially conforming to the shape of the recesses, the guide arms and recesses each having a respective surface which is oriented in a plane extending along the third axis, and the guide arms being received within the respective recesses.

4. The clamping assembly claimed in claim 3, wherein the recesses are radially interposed between an inner surface defining the first central bore and the radially outer surface of the first clamping member, and the guide arms are radially interposed between an inner surface defining the second central bore and a radially outer surface of the second clamping member.

5. The clamping assembly claimed in claim 4, wherein the guide means includes two recesses formed in the first end surface, and two guide arms extending axially from the second end surface.

6. The clamping assembly claimed in claim 3, wherein the first and second end surfaces are both oriented in a plane extending transverse to the first axis.

7. The clamping assembly claimed in claim 1, wherein the first and second central bores are rectangular.

8. The clamping assembly claimed in claim 1, wherein the measuring instrument is a height gage.

9. The clamping assembly claimed in claim 8, wherein the probe device is a scribe.

10. The clamping assembly claimed in claim 1, wherein the measuring instrument is a caliper having a longitudinally extending main blade and first and second sliding members which are relatively slidably movable on the main blade.

11. The clamping assembly claimed in claim 10, wherein a clamping assembly is provided on each of the first and second sliding members.

12. The clamping assembly claimed in claim 11, wherein a standard plate and a scriber are attached to the first and second sliding members, respectively.

13. The clamping assembly claimed in claim 11, wherein the first and second sliders are equipped with a point jaw.

14. The clamping assembly claimed in claim 11, wherein the first and second sliders are equipped with an M-type jaw.

15. A clamping assembly for attaching a probe device to an attachment arm of a measuring instrument which extends from the instrument along a first axis, the probe device having a base arm adjacent to the attachment arm in an axially overlapping manner, the assembly comprising:

a first annular clamping member proximate the measuring instrument, the first clamping member having a first axially extending central bore therethrough and an externally threaded portion on a radially outer surface thereof;

a second annular clamping member positioned axially adjacent the first clamping member remote from the measuring instrument and having a second axially extending central bore therethrough, the second clamping member being axially movable relative to the first clamping member, and the attachment and base arms extending through the first and second central bores;

an annular clamping ring encompassing the first and second clamping members, the clamping ring having an annular flange extending radially inwardly from an end surface of the clamping ring proximate the probe device and an internally threaded portion which threadably engages the externally threaded portion of the first clamping member to effect a relative axial movement between the clamping ring and the first clamping member, the annular flange urging the second clamping member in a direction along the first axis during the relative axial movement; and means for guiding the second clamping member along a second axis extending transverse to the first axis during the relative axial movement to effect an offset of the second central bore relative to the first central bore along a third axis extending perpendicular to the first axis thus urging the base arm into abutment with the attachment arm in a direction along the third axis.

* * * * *